July 22, 1924.
A. F. GILLET
1,501,990
OIL LEVEL INDICATING ATTACHMENT FOR CRANK CASES
Filed March 25, 1921
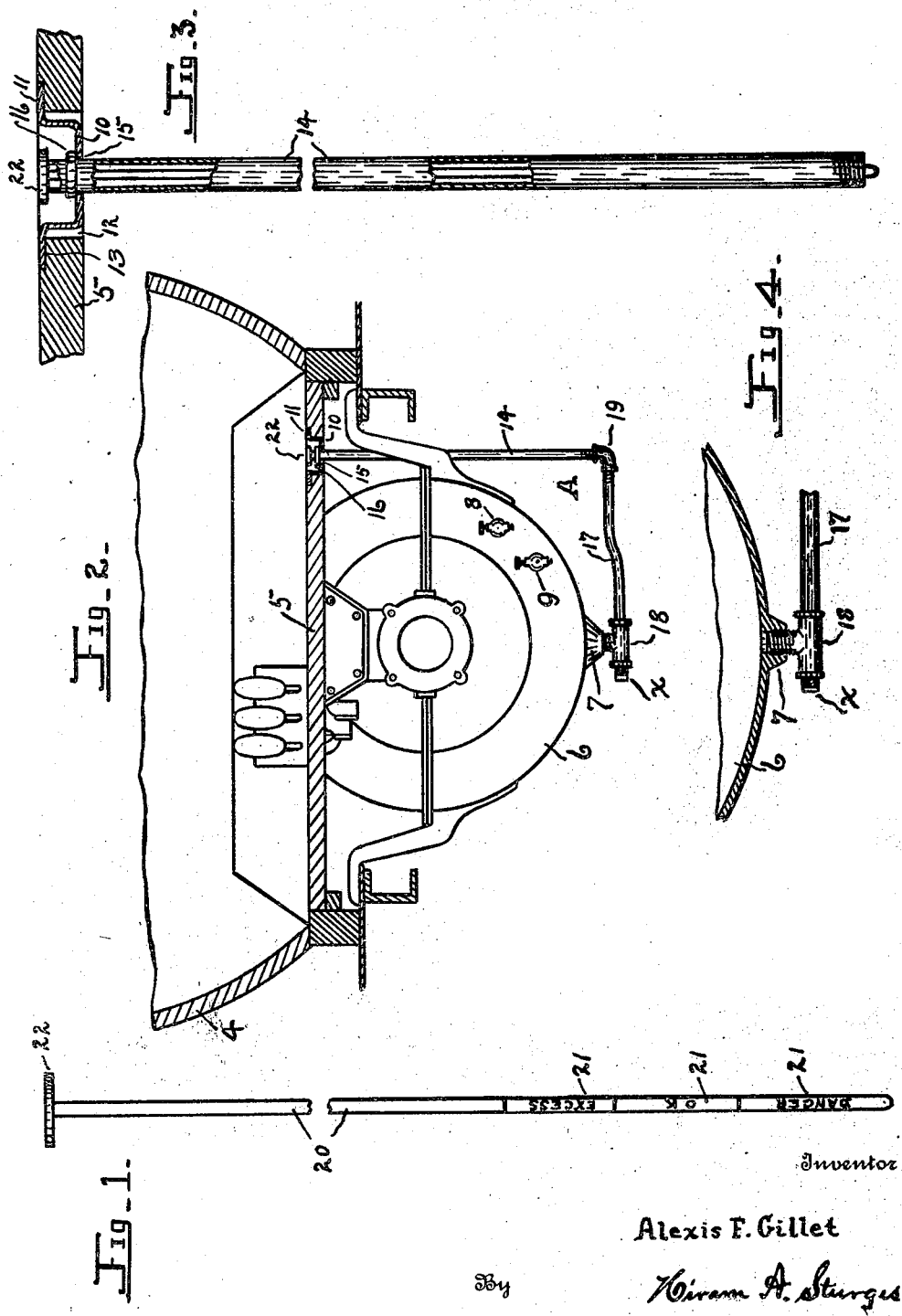
Inventor
Alexis F. Gillet
By Hiram A. Sturges
Attorney Patented July 22, 1924.

1,501,990

UNITED STATES PATENT OFFICE.

ALEXIS F. GILLET, OF OMAHA, NEBRASKA, ASSIGNOR TO JUBILEE MANUFACTURING COMPANY, OF OMAHA, NEBRASKA, A CORPORATION OF NEBRASKA.

OIL-LEVEL-INDICATING ATTACHMENT FOR CRANK CASES.

Application filed March 25, 1921. Serial No. 455,416.

*To all whom it may concern:*

Be it known that I, ALEXIS F. GILLET, a citizen of the United States, residing at Omaha, in the county of Douglas and State of Nebraska, have invented certain new and useful Improvements in Oil-Level-Indicating Attachments for Crank Cases, of which the following is a specification.

The invention has for its object, broadly, to provide a means for ascertaining the supply of oil in the engine crank case of an automobile. One of the specific objects is to provide a tubular container which will communicate with the bottom of the crank case and may be disposed approximately in a vertical position, so that the indicating-rod may accurately register the depth of the oil and may extend to a level corresponding to the lowermost part of the crank case. Another object is to provide such a construction that the indicating-rod may be accessible for conveniently ascertaining the supply of oil in the crank case. Still another object is to provide an attachment for the purpose described which may be practically manufactured and may readily be mounted upon an automobile by any person of ordinary skill.

In the accompanying drawing which illustrates the invention, Fig. 1 is a broken, side view of an indicating-rod. Fig. 2 is an end view of the engine crank case with the oil-level indicating attachment applied thereto, a part of the body of an automobile being shown in transverse section. Fig. 3 is a broken, side view of the rectilinear part of the L-shaped, tubular container and its mounting in the floor of an automobile. Fig. 4 shows a portion of the bottom of the crank case and a T pipe-coupling connection therewith for a part of the L-shaped, tubular container.

Referring now to the drawing for a more particular description, the invention is shown and described in connection with the body 4 of an automobile including a floor 5, the crank case for the engine being indicated at 6.

The indicator to be described is particularly designed for use upon the Ford type of automobiles. The engine crank case for these automobiles is provided, to extend below its bottom, with a boss 7 for a threaded mounting therein of a screw plug (not shown) to permit drainage as occasion may require. It will be understood that oil is placed in the crank case sufficient in quantity to fill it to a certain, limited depth for lubricating the engine, and to avoid an excess or an inadequate supply of oil test-cocks 8 and 9 have been used to determine the depth of the oil, these being mounted in the end of the crank case, and since these test-cocks are not readily accessible, their use is inconvenient and impractical.

In order that the supply of oil may be conveniently ascertained I provide a tubular container A approximately of L-shape, supported by and extending downwardly from the floor 5. Numeral 10 indicates an apertured cup having a flange 11, said cup and its flange being disposed in an aperture 12 having a recess 13 opening thereon, said aperture and recess being formed in the floor. The rectilinear, upright part 14 of the L-shaped container is adapted to be inserted in the aperture 15 of the cup and is provided with a collar 16 adapted to be disposed in the cup to rest on the bottom thereof, and which operates to sustain the weight of the container A or a part thereof, the horizontal part 17 of said container being connected at one of its ends with a T pipe-coupling 18 which is mounted in the threaded aperture of the boss 7, its opposite end being threaded in an elbow pipe-coupling 19 in which the lower end of the upright part 14 is also threaded.

It will thus be seen that the L-shaped container communicates with the bottom of the crank case, and that its horizontal part 17 and the distal end of the upright part 14 are disposed lower than the lowest level of the crank case, and since the oil in the upright part 14 will be at the same level as the oil in the crank case, it may be measured, and the depth of oil in the latter may be determined by use of an indicating-rod 20.

The rod 20, adjacent to its lower end, is provided with suitable indicating characters 21, these being disposed in spaced relation, longitudinally of the rod. It is provided at its upper end with a disc 22 having a lesser diameter than the diameter of the cup and operating as a handle, and when the rod is disposed in the upright part 14 of the container, the disc will engage the upper end thereof and will be disposed in the plane of the flange 11, and on account of the operation of the collar 16, the disc will be maintained above the bottom of the cup, so that it may be conveniently grasped for withdrawal, said rod having such a length that its lower end will normally be disposed in a position fully as low as the bottom of the crank case. The oil will adhere to the rod, and when the rod is drawn outwardly, the depth of the oil in the crank case will be visibly indicated.

Among some of the advantages to be derived by use of the herein described indicator, it may be stated that, since the part 14 of the container A is maintained in, approximately, a vertical position, the oil on the rod 20 will correctly indicate the depth of oil in the crank case; also the fact that the rectilinear part 14 extends downwardly a distance equal to or beyond the plane of the crank case, is obviously an advantage to permit measurement of the oil. If there is an excess of oil it may be drawn off by use of one of the cocks 8 or 9, and if there is a deficiency, additional oil may be supplied to the crank case. It will be noted that the tests may be made by an operator while within the automobile, which is a feature of convenience; and since the disc or handle 22 of the rod 20 does not project above the surface of the floor it will not be obtrusive and will not be disturbed by occupants of the automobile.

It will be seen that the device may be readily applied to an automobile. The aperture 12 being first formed in the floor 5 and the pipe-coupling 18 and elbow 19 being mounted on the part 17, said coupling 18 may be mounted in the threaded boss 7; the upright part 14 may then be inserted in the aperture 15 of the cup 10 and threaded in the elbow 19; and it is obvious that the device will not interfere with complete drainage of the crank case since said member 18 is provided with a screw-plug $x$ which may be removed for cleaning out the crank case.

I claim:

In an oil indicating attachment for the crank case of a vehicle having a floor provided with an aperture, a pipe coupling threaded in the crank case, an apertured cup provided with a flange and adapted to be disposed in the aperture of the floor, a tubular container including a horizontal part communicating with the pipe coupling and a vertical part adapted to loosely engage in the aperture of the cup and connecting with said horizontal part and having a collar adapted to bear upon the upper surface of the bottom of said cup for a support of said tubular container, and an indicating rod provided with a handle and adapted to be inserted in the vertical part of the tubular container with its handle normally disposed in the cup in line with the flange thereof.

In testimony whereof, I have affixed my signature in presence of two witnesses.

ALEXIS F. GILLET.

Witnesses:
 HIRAM A. STURGES,
 ARTHUR H. STURGES.